Sept. 16, 1952     C. T. HAYES     2,610,872
SHAFT SEAL

Filed Oct. 6, 1948     2 SHEETS—SHEET 1

Charles T. Hayes,
Inventor,
Haynes and Koenig,
Attorneys.

Sept. 16, 1952 C. T. HAYES 2,610,872
SHAFT SEAL
Filed Oct. 6, 1948 2 SHEETS—SHEET 2

Charles T. Hayes,
Inventor,
Haynes and Koenig,
Attorneys

Patented Sept. 16, 1952

2,610,872

UNITED STATES PATENT OFFICE 2,610,872

SHAFT SEAL

Charles T. Hayes, Kenosha, Wis., assignor to Dynamatic Corporation, Kenosha, Wis., a corporation of Delaware Application October 6, 1948, Serial No. 53,045

4 Claims. (Cl. 286—11)

This invention relates generally to rotary shaft seals, and more particularly to water seals for the shafts of water-containing dynamometers, clutches and the like.

Among the several objects of the invention may be noted the provision of an improved seal for a rotating shaft for preventing leakage of fluid from one side of the seal to the other; the provision of a self-lubricating, low-friction shaft seal of the class described which allows rotation of the shaft at high speeds without overheating of the seal; the provision of a shaft seal of this class adapted for operation for very long periods of time without wearing to the point where leakage will occur; the provision of a shaft seal such as described adapted to accommodate eccentricities of the shaft; and the provision of a shaft seal such as described which is of simplified construction, economical to manufacture, easy to install and reliable in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a longitudinal section illustrating a first embodiment of the invention;

Similar reference characters indicate corresponding parts throughout the several views of the drawings.

Figure 1:
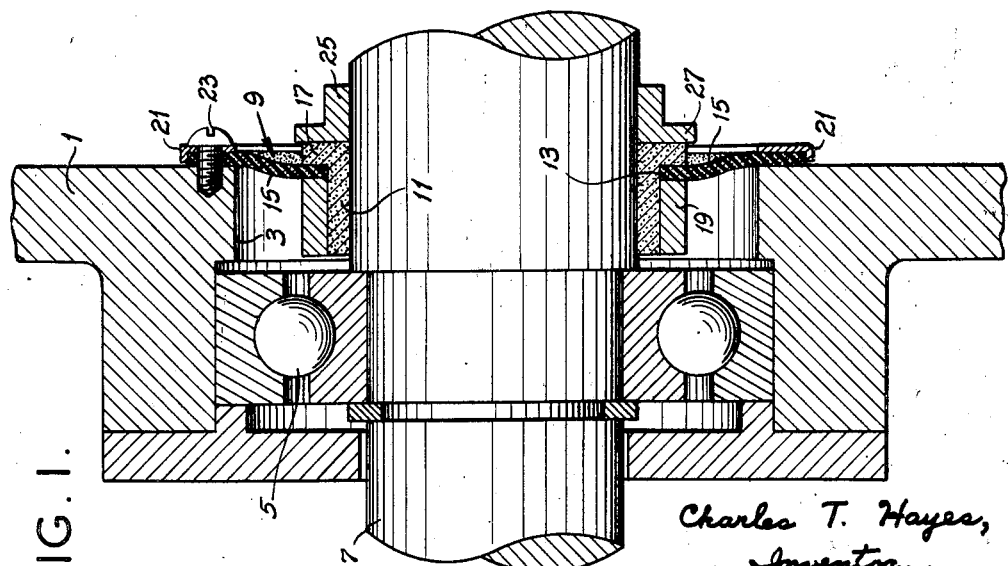

Referring to Fig. 1, there is shown at 1 an end wall of the housing of an exemplary water-cooled eddy-current dynamometer, coupling, clutch or the like. In this wall is a bearing aperture 3 in the outer end of which is a ball bearing assembly 5. A shaft 7 extends through the aperture 3 and is journalled in the ball bearing. Numeral 9 generally designates a shaft seal of this invention for preventing leakage of water from within the housing through aperture 3 to the bearing 5.

As illustrated, shaft seal 9 comprises a rigid, porous sleeve 11 of oil-impregnated sintered and compressed bronze or similar metal. The internal diameter of the sleeve 11 is such that it has a running fit with respect to shaft 7, the shaft being ground to a journal finish throughout the portion of its periphery engaged by the sleeve. The sleeve 11 is concentrically fixed within the central aperture 13 of a flexible and resilient closure member or diaphragm 15, comprising a disc of synthetic oil-resistant rubber or other suitable flexible material. As illustrated, the sleeve is formed with an outwardly extending flange 17 on its end remote from bearing 5. A collar 19 press-fitted on sleeve 11 compresses against flange 17 the inner annular portion of diaphragm 15. This fixes the sleeve 11 in the central opening in the diaphragm to provide a seal against leakage between the diaphragm and the sleeve.

The diaphragm 15 is secured to the wall 1 to seal off the inner end of aperture 3 by means of an annular metal ring 21 and cap screws 23. The diameter of diaphragm 15 is substantially greater than the diameter of aperture 3 so that the outer annular peripheral portion of the diaphragm engages the portion of wall 1 surrounding aperture 3. Ring 21 compresses the outer annular portion of the diaphragm against the wall 1 for sealing purposes.

A sealing ring 25 having at one end an outwardly extending flange 27 is fixed on shaft 7 in position for a running sealing engagement of the end face of flange 27 with the end face of flange 17 of sleeve 11. The ring 25 may be press-fitted on the shaft or secured thereon in any other suitable way so as to be rotatable with the shaft and to prevent leakage between the ring and the shaft. The sealing ring 25 is located in such position as to distort the flexible diaphragm 15 toward the bearing 5. The diaphragm 15 therefore biases sleeve 11 toward ring 25 so that the sleeve is pressed lightly against the ring. This provides a radially directed running seal at the contacting faces of flange 17 of sleeve 11 and flange 27 of the sealing ring 25. This prevents fluid from passing between the flanges to the interior of sleeve 11.

The diameter of flange 27 is somewhat greater than the diameter of flange 17. Hence flange 27 acts as a centrifugal thrower or slinger to throw fluid outward from sealing ring 25 upon rotation of the shaft. This tends to prevent fluid from reaching the seal between the contacting faces of flanges 17 and 27.

It will be clear from the above that shaft seal 9 effectively prevents leakage of fluid through aperture 3 from the interior of the housing to bearing 5. Fluid tending to reach the seal at the contacting faces of flanges 17 and 27 is thrown outward by the flange 27. Should any fluid escape the centrifugal action of flange 27, all if not most of it is prevented from flowing to the interior of sleeve 11 at the running seal between the contacting faces of flanges 17 and 27. If, however, any fluid should reach the interior of sleeve 11, it will be prevented from flowing along the periphery of shaft 7 to the bearing 5 by the running seal between the interior surface of sleeve 11 and the periphery of the shaft 7. The fluid cannot leak out through the central opening 13 in diaphragm 15 nor between the periphery of the diaphragm 15 and the wall 1 of the housing because the compressed portions of the diaphragm act as packings to prevent leakage.

Since the sleeve 11 is formed of oil-impregnated material, the seal is self-lubricating and operates with little friction between the interior of sleeve 11 and the periphery of shaft 7, and between the contacting sealing faces of flanges 17 and 19. Since sleeve 11 is carried within the flexible diaphragm 15, it is floatingly mounted for radial movements to accommodate any eccentricities of shaft 7 resulting from inaccurate journalling of the shaft or other causes. Also, since sleeve 11 is floatingly mounted by means of the flexible diaphragm 15, there is little or no bearing load upon the sleeve. This permits shaft 7 to be rotated at very high speeds without overheating of the seal and permits operation of the shaft for very long periods of time without undue wear between rubbing surfaces of the parts of the seal. The above points of advantage are particularly useful in connection with the large shafts (often several inches in diameter) employed on dynamometers and the like of substantial sizes.

Sealing ring 25 may be omitted, although the seal is improved by its use. A satisfactory seal may be obtained by the use of oil-impregnated sleeve 11 without sealing ring 25 since use of the self-lubricating sleeve permits reduction of running clearance of the interior of the sleeve and the periphery of shaft 7 to the degree where an effective fluid-tight seal is provided between these parts.

Figure 2:
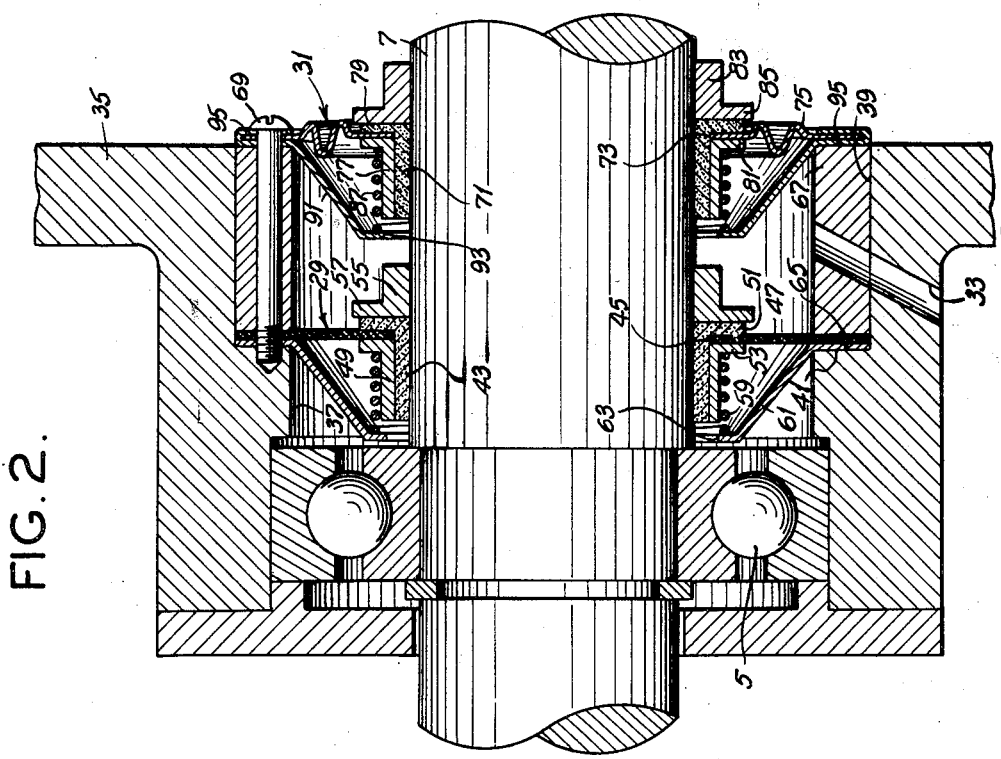
Fig. 2 is a similar section illustrating a second embodiment.

Fig. 2 illustrates an arrangement embodying two seals 29 and 31 of the same general type as the seal of Fig. 1 in series, with a drain 33 between the seals for any leakage that may occur through the inside seal 31. In Fig. 2, numeral 35 designates the end wall of the housing of a watercooled dynamometer, eddy-current coupling, clutch or the like, having a longer bearing aperture 37 than the aperture 3 in Fig. 1. Ball bearing assembly 5 is fitted in the outer end of bearing aperture 37. Shaft 7 extends through the aperture 37 and is journalled in the ball bearing. The aperture 37 is counterbored from its inner end, as indicated at 39, to provide a shoulder 41 at the inner end of the counterbore.

Seal 29 is located at the inner end of the counterbore 39. It comprises an oil-impregnated sleeve 43 like sleeve 11 fixed in the central opening 45 of a flexible diaphragm 47 like diaphragm 15 by means of a collar 49. Sleeve 43 has an end flange 51 on its end remote from bearing 5. Collar 49 also has an end flange 53 and is press-fitted on the sleeve in such manner as to compress the inner annular portion of diaphragm 47 surrounding the central opening therein between flange 53 and the flange 51 on sleeve 43. A sealing ring 55 like sealing ring 25 of Fig. 1 is fixed on shaft 7 in position for running sealing engagement of the end face of flange 55 at one end of the ring with the end face of flange 51 of sleeve 43. Ring 55, however, is not necessarily located in such position as to distort the flexible diaphragm 47 toward bearing 5 as in Fig. 1, inasmuch as the sleeve 43 is biased toward ring 55 by a coil compression spring 59.

Spring 59 surrounds the collar 49 and reacts against the flange 53 of the collar from an annular cage 61 surrounding shaft 7. The cage 61 is of generally cup-shape, having an aperture 63 in its bottom accommodating shaft 7 and an outwardly extending rim 65 which abuts the shoulder 41. The outer peripheral portion of diaphragm 47 abuts rim 65 and is compressed by a ring 67 fitted in the counterbore 39 and retained in place by screws 69 extending through the ring 67 and threaded into the wall 35 of the housing.

Shaft seal 31 is located at the outer end of counterbore 39. It comprises an oil-impregnated sleeve 71 like sleeves 11 and 43 fixed in the central opening 73 of a flexible metallic diaphragm 75 by means of a collar 77 like collar 49. Sleeve 71 has an end flange 79 like flanges 17 and 51 on its end remote from the bearing 5. Collar 77 also has an end flange 81 and is press-fitted on the sleeve 71 in such manner that the inner annular portion of the flexible metallic diaphragm 75 is clamped between the flanges 79 and 81 for sealing purposes. A sealing ring 83 having an end flange 85 is fixed on shaft 7 in position for engagement of the end face of flange 85 with the end face of flange 79 of the sleeve 71. As in the case of the shaft seal 29, it is not necessary that the ring 83 distort flexible diaphragm 75, inasmuch as sleeve 71 is biased toward ring 83 by a coil compression spring 87.

Spring 87 reacts against the flange 81 of collar 71 from an annular cage 91 similar to the cage 61 of seal 29. Cage 91 has an aperture 93 in its bottom through which shaft 7 extends, and has a peripheral rim 95 which is bent around the periphery of flexible metallic diaphragm 75. The rim 95 abuts the end of ring 67 and is fixed in place by the screws 69, which extend through rim 95 and then through the ring 67. The screws are threaded into wall 35 sufficiently to clamp the rim sealingly against the end of the ring 67.

Flanges 57 and 85 of the sealing rings 55 and 83 are of greater diameter than flanges 51 and 79 of the sleeves 43 and 71 so as to constitute slingers in the same manner as flange 27 of sealing ring 25 in Fig. 1. It will be understood that each of seals 29 and 31 function in the same manner and have the same advantages as the seal 9 of Fig. 1. Should any fluid leak past seal 31 it will be prevented from leaking out to bearing 5 by seal 29, and will drain out through drain 33, which passes through wall 35 and ring 67. This leads from the space between the two seals to the exterior of the apparatus.

If a seal such as shown in Fig. 1 is employed under conditions wherein any oil that may be exuded from the oil-impregnated sealing sleeve 11 may be washed away before it is re-absorbed by the sleeve, the sleeve may slowly lose its oil and ultimately become dry of oil. For example, if the seal is employed under conditions where it is partially or completely submerged in water and is subject to temperature variations, a slight increase in temperature causes the sleeve to exude oil, which is floated away with the water in which the seal is submerged before it can be re-absorbed. When the sleeve, under such conditions, becomes dry of oil, its rate of wear increases rapidly and it no longer provides a satisfactory seal. To adapt the seal of Fig. 1, for example, for use under such circumstances, it may be modified as illustrated in Figs. 3 and 4 to include a lubricator for maintaining the oil content of the oil-impregnated sealing sleeve substantially constant over a considerable period despite washing away of exuded oil or loss of oil due to other factors.

Figure 4:
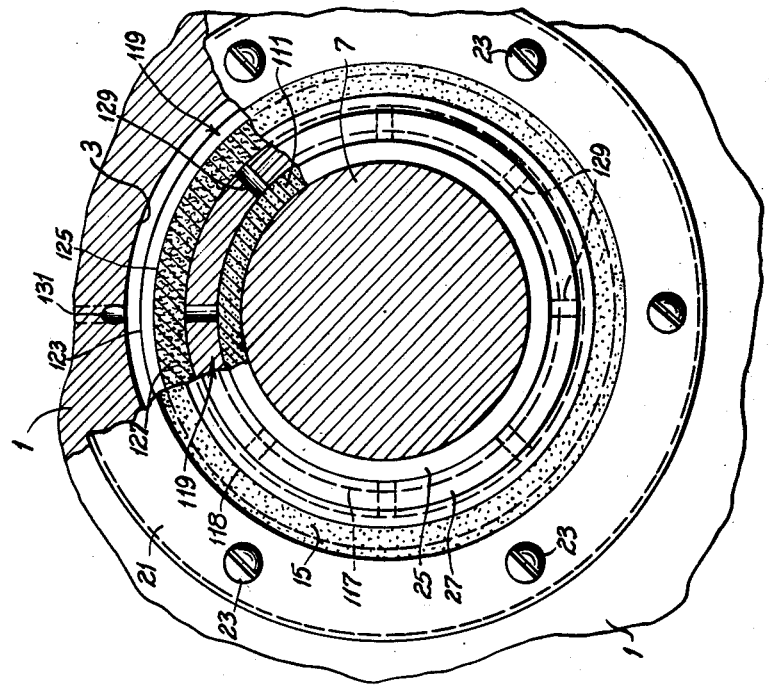
Fig. 4 is an end view of Fig. 3 as viewed from the right, with parts broken away and shown in section.
Figure 3:
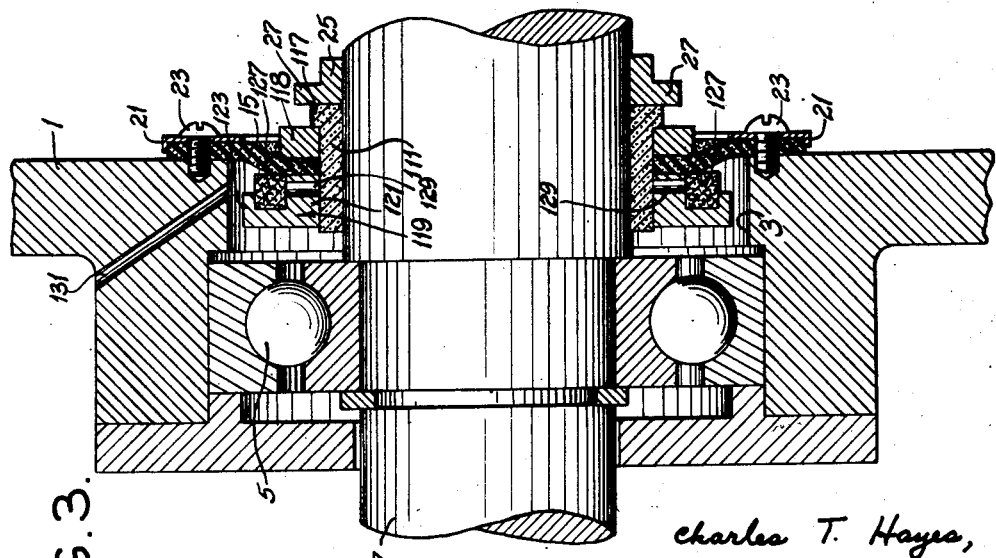
Fig. 3 is a similar section illustrating a third embodiment.

As shown, the seal of Figs. 3 and 4 is substantially the same as the seal shown in Fig. 1, with similar reference characters indicating corresponding parts, with the exception that the oil-impregnated sleeve, designated 111 in Figs. 3 and 4, has a smaller flange 117 than the flange 17 of sleeve 11 of Fig. 1, and is fixedly sealed in the central opening in diaphragm 15 between a separate flange 118 press-fitted on the sleeve against the flange 117 and a special lubricator collar 119 which takes the place of collar 19 of Fig. 1. The collar 119 is formed with a hub 121 which is press-fitted on the sleeve 111 and compresses against the collar 118 the inner annular portion of diaphragm 15. On the end of the hub 121 remote from the diaphragm is an outwardly extending flange 123. In the face of this flange toward the diaphragm is an annular groove or recess 125 immediately surrounding the hub. Fitted in the groove 125 and surrounding the hub is a ring or wick 127 of felt or similar absorbent material which is initially saturated with lubricating oil. The ring 127 is held in the groove by the diaphragm 15. The hub 121 has a series of small radial apertures 129 therethrough leading from the oil-saturated felt ring 127 to the periphery of the sleeve 111. The arrangement is such that oil is supplied from the ring 127 to the sleeve through the holes 129 by capillary action to replenish oil lost by the sleeve. An oil hole 131 may be provided in the wall 1 of the housing in which the seal is mounted to provide for re-saturating felt ring 127 with oil at infrequent intervals, if necessary.

It will be understood that cylindric bellows-type closure members may be substituted for the flat bellows-type diaphragm closure members disclosed herein, and the terms "closure member" and "diaphragm" are intended to include various bellows.

It will be understood that either of the constructions shown in Fig. 2 may be used singly. Also, of the four forms of the sealing portions of the invention shown in Figs. 1, 2, and 3 any one may be used in multiple.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. For use in a shaft seal, a flexible closure member having an opening, an oil-impregnated sleeve of porous material fixed concentrically within the opening in the member in sealed relation with respect to the member, the sleeve being adapted for a self-lubricating running seal between its interior and the periphery of a shaft extending through the sleeve, and lubricating means including an absorbent wick adapted to be saturated with oil carried by the sleeve for supplying oil thereto to make up loss of oil from the sleeve.

2. For use in a shaft seal, a flexible diaphragm having a central opening, an oil-impregnated sleeve of compressed sintered metal fitted in the central opening in the diaphragm and sealed with respect thereto, a collar fixed on the sleeve having a recess, oil-saturated absorbent material in said recess, said collar having an aperture leading from said recess to the sleeve for supplying oil from said material to the sleeve to make up loss of oil from the latter.

3. For use in a shaft seal, a flexible diaphragm having a central opening, an oil-impregnated sleeve of rigid porous material having a flange, said sleeve being fitted in the central opening in the diaphragm with its flange abutting the diaphragm, and a collar fitted on the sleeve and compressing the portion of the diaphragm surrounding the sleeve against the flange, said collar having an annular groove therein, a ring of oil-saturated absorbent material fitted in said groove, said collar having apertures leading from said groove to the periphery of the sleeve for supplying oil from said oil-saturated ring to the sleeve to make up loss of oil from the latter.

4. For use in a shaft seal, a flexible diaphragm having a central opening, an oil-impregnated sleeve of compressed sintered metal having a flange, said sleeve being fitted in the central opening in the diaphragm with its flange abutting the diaphragm, and a collar having a hub fitted on the sleeve compressing the portion of the diaphragm surrounding the sleeve against said flange, an outwardly extending flange on the end of the hub remote from the diaphragm having an annular groove immediately surrounding the hub and facing toward the diaphragm, and a ring of oil-saturated absorbent material fitted in said groove, said hub having a series of small radial holes therethrough leading from the groove to the periphery of the sleeve.

CHAS. T. HAYES.

REFERENCES CITED

The following references are of record in the file of this patent:

UNITED STATES PATENTS

| Number | Name | Date |
| --- | --- | --- |
| 1,158,719 | Reynolds | Nov. 2, 1915 |
| 1,170,285 | Lachmann | Feb. 1, 1916 |
| 1,789,978 | Hull | Jan. 27, 1931 |
| 1,930,312 | Greenhoe | Oct. 10, 1933 |
| 2,080,403 | Homan | May 18, 1937 |
| 2,209,856 | Smith et al. | July 30, 1940 |
| 2,354,478 | Reinhardt et al. | July 25, 1944 |
| 2,382,960 | Compton et al. | Aug. 21, 1945 |
| 2,440,155 | Peterson et al. | Apr. 20, 1948 |

FOREIGN PATENTS

| Number | Country | Date |
| --- | --- | --- |
| 484,628 | Germany | of 1929 |
| 518,339 | Great Britain | of 1940 |